United States Patent [19]

Taylor et al.

[11] Patent Number: 4,787,209
[45] Date of Patent: Nov. 29, 1988

[54] STACKED RING COMBUSTOR ASSEMBLY

[75] Inventors: Charles R. Taylor; George Opdyke, Jr., both of Stratford, Conn.

[73] Assignee: Avco Corporation, Providence, R.I.

[21] Appl. No.: 185,309

[22] Filed: Apr. 20, 1988

Related U.S. Application Data

[63] Continuation of Ser. No. 45,701, Apr. 29, 1987, abandoned, which is a continuation of Ser. No. 802,669, Nov. 29, 1985, abandoned.

[51] Int. Cl.$^4$ .............................................. F02C 7/00
[52] U.S. Cl. ......................................... 60/757; 60/754
[58] Field of Search ................. 60/752, 754, 755, 756, 60/757, 39.32, 759

[56] References Cited

U.S. PATENT DOCUMENTS 3,962,772 6/1976 Haller ............................. 29/DIG. 4
4,490,186 12/1984 Sines et al. .
4,566,280 1/1986 Burr ..................................... 60/757

Primary Examiner—Louis J. Casaregola
Assistant Examiner—Timothy S. Thorpe

[57] ABSTRACT

An assembly of stacked rings is provided to form the cylindrical section of a combustor such as used in a gas turbine engine. Each ring is force-fitted into its adjacent ring and joined to it, as by brazing, to form a unitary structure. The rings are configured to assure proper alignment when fitted together and provide a space for holding brazing material immediately adjacent to the mating surfaces to be joined so that the brazing material, when fused in a vacuum furnace, flows evenly between the surfaces. To assure proper distribution of the brazing material when fused, one of the mating surfaces may be upset, as by knurling, to a dimension assuring a light force-fit of the parts to be joined. Each ring also includes a shaped portion projecting into the interior of the assembly for directing cooling air, introduced through the side walls of the rings, along the interior surfaces of the assembly to protect it from high temperature gases generated by combustion of fuel within the combustor.

4 Claims, 2 Drawing Sheets

STACKED RING COMBUSTOR ASSEMBLY

This is a continuation of application Ser. No. 045,701 filed on 4.29.87 now abandoned which is a continuation of Ser. No. 802,669, filed 11.29.85 now abandoned.

BACKGROUND OF THE INVENTION

Combustors for gas turbine engines typically comprise an assembly of parts formed from high temperature corrosion resistant steel, the parts being joined together to form a unitary structure. In prior art combustors, a cylindrical shell is used, and a plurality of rings are brazed or otherwise joined to the shell to provide channels through which cooling air may be introduced to protect the combustor from high temperature gases generated when fuel is burned within the combustor. Proper placement and brazing of the rings on the shell is a time-consuming, expensive operation.

The present invention comprises a plurality of rings which can be stacked and joined together to provide a combustor assembly at lower cost and with greater accuracy than possible in prior art devices.

SUMMARY OF THE INVENTION

The preferred embodiment of the present invention provides an assembly of stacked rings which are force-fitted and brazed together to form a unitary structure replacing the prior art shell and the rings secured to it. Each ring of the present invention has a cylindrical portion at one end and a shaped portion at the other end with a step between them which is proportioned to accommodate the diameter of the cylindrical portion of the adjacent ring, making it possible to nest them together in proper alignment without the use of any jigs or fixtures. The rings are further configured to provide space for brazing material immediately adjacent the force-fitted surfaces, one of which may be upset, as by knurling (straight or diamond) to establish a proper fit and to assure even distribution of the brazing material when it is fused in a vacuum furnace. The shaped portions of the rings project into the interior or from the exterior of the assembly providing channels for the introduction of cooling air along the interior or the exterior of the assembly when the combustor is in use.

DESCRIPTION OF THE DRAWINGS

The invention is described in more detail below with particular reference to the attached drawings in which.

DESCRIPTION OF THE STACKED RING ASSEMBLY

Figure 1:
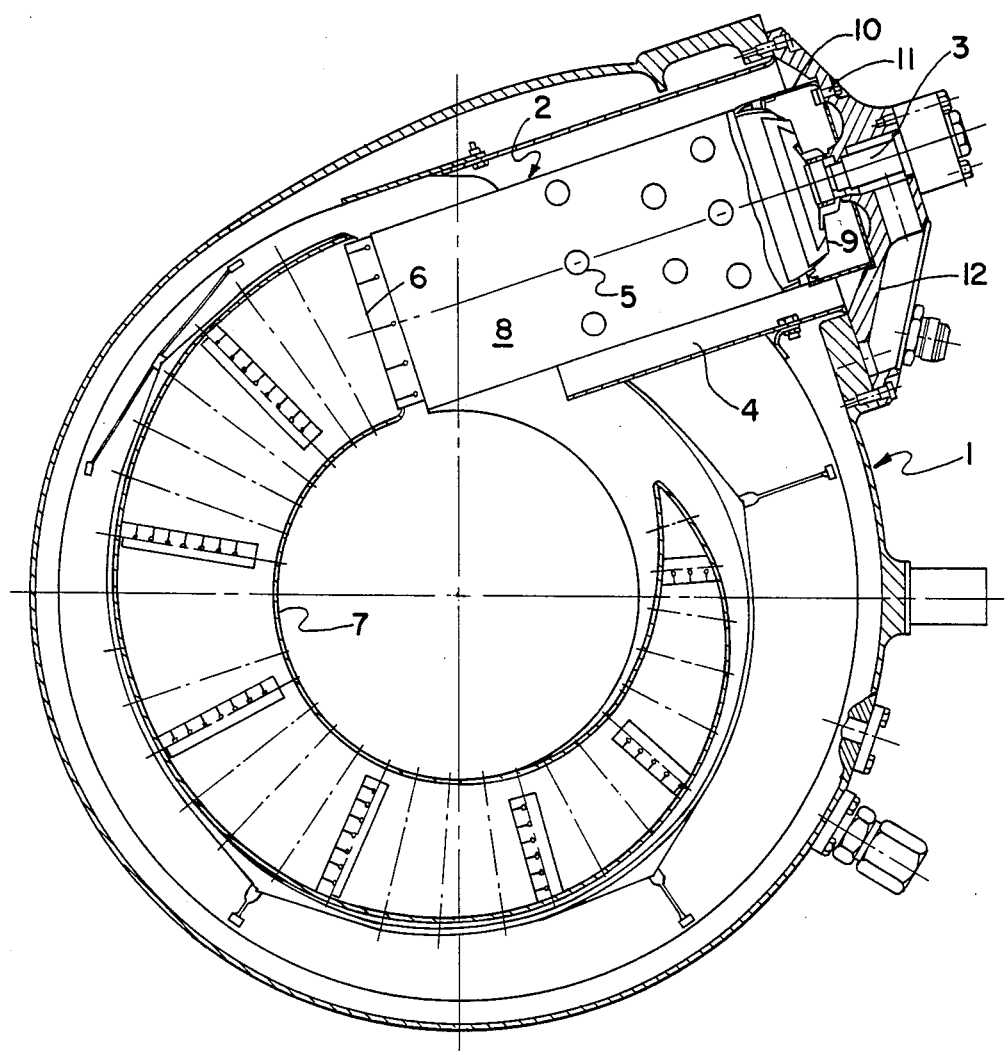
FIG. 1 is a cross sectional view of a gas turbine showing a combustor in operative position.

Referring first to FIG. 1, there is shown the cross section of a gas turbine engine, generally designated 1, incorporating a combustor, generally designated 2. Fuel, sprayed into the combustor by fuel injector 3, is burned in the presence of air supplied by the engine's compressor section (not shown). Compressed air from the compressor section is supplied to cavity 4 surrounding the combustor 2, the air entering the combustor through a plurality of ports 5, as will be more fully described with reference to FIG. 2. High temperature gases leave the combustor at 6 and flow into a scroll 7 which conducts the high temperature gas stream to the engine's turbine section (not shown).

The combustor comprises a cylindrical section 8 secured to an end assembly 9. A cap 10 is welded to cylindrical section 8 and bolted, as at 11, to housing 12 of the gas turbine engine.

Figure 2:
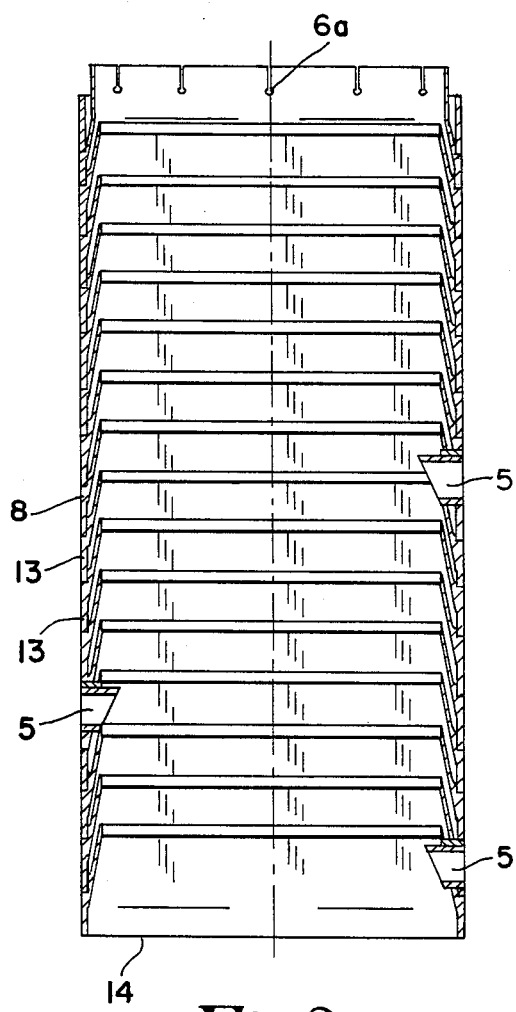
FIG. 2 is a cross sectional view of a stacked ring combustor assembly employing the teaching of the present invention.

Cylindrical section 8 is shown in greater detail in FIG. 2. As shown in that figure, it comprises a plurality of stacked rings 13 which are joined together to form a unitary structure. End assembly 9 and cap 10 are designed to engage end 14 of the structure, the opposite end being slotted at 6a for forced engagement with scroll 7 as has been described with reference to FIG. 1.

Ports 5 are arranged circumferentially around the cylindrical section in groups at different locations along its length. Those closest to end 14 provide primary air for combustion of fuel, those next along the length of the section providing secondary air for combustion, the last group of ports providing air for diluting and reducing the temperature of the gases generated by combustion of fuel within the combustor.

Figure 3:
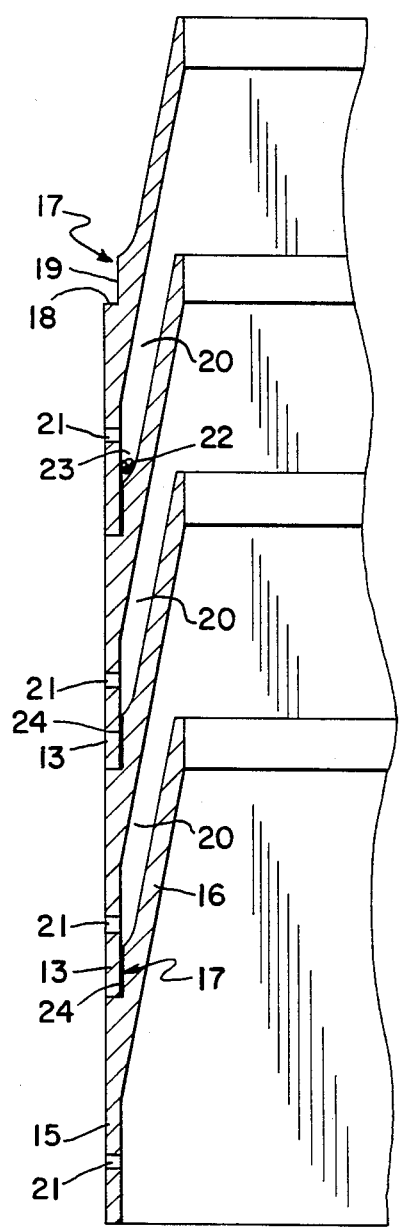
FIG. 3 is an enlarged cross sectional view of a plurality of the rings shown in FIG. 2.

As shown in FIG. 3, each ring 13 of the cylindrical section comprises a cylindrical portion 15 at one end and a shaped portion 16, which may be conical in form, at the other end. Between the ends is a step, generally designated 17, formed of a flat surface 18 lying in a plane normal to the axis of the ring and a cylindrical surface 19 that is formed concentrically with the cylindrical portion 15. During the manufacture of each ring, its surface 19 is machined so that it is slightly smaller than the internal diameter of cylindrical portion 15. Thereafter surface 19 is upset by knurling to a final diameter slightly larger than the internal diameter of cylindrical portion 15 assuring a light interference fit when the rings are force-fitted together as shown in FIG. 3. Typically, the interference fit is .001 inch for a 5 inch diameter ring. The parts are forced together until the end of cylindrical section 15 butts against surface 18 of the adjacent ring.

It should be noted in FIG. 3 that the shaped portion 16 of each ring projects into the interior of the stacked assembly, adjacent shaped portions defining channels 20. Cooling air from cavity 4 is introduced to the channels 20 by a plurality of holes 21 formed through the side walls of the rings. The cooling air, flowing along the surfaces of the shaped portions of the rings, cools the interior surfaces of the structure to prevent overheating by the combustion gases.

As will be evident to those skilled in the art, a stacked assembly could be designed with the cooling air on the exterior of the cylinder and that both types of assemblies could be combined into a structure in which the combustion gases are surrounded by two cylindrical walls.

Brazing of Stacked Ring Assembly

By force-fitting the rings 13 together as has been explained, the rings are automatically aligned and require no jigs or fixtures while they are being joined together, as by brazing. During brazing, the assembled rings are stood upright in a vacuum furnace with brazing material 22, typically a high temperature nickel alloy, placed in space 23 defined by juxtaposed shaped and cylindrical portions of adjacent rings as shown in FIG. 3. As the temperature of the furnace is raised to the point where the brazing material fuses, the molten material flows evenly along the knurled surfaces between each ring, as shown at 24, securely joining them together, both mechanically and thermally. The resulting unitary structure is not only strong but also has a smooth, dimensionally accurate exterior surface. After the brazing operation is completed, the other components of the combustor can be readily assembled to it.

Conclusion

From the foregoing description of the preferred embodiment of the invention, it will be understood that it provides an improved way to manufacture a combustor for a gas turbine engine, one which guarantees the structural integrity and dimensional accuracy of the combustor at a cost less than possible following the teaching of the prior art.

According to the above description, the following invention is claimed as novel and is desired to be secured by Letters Patent of the United States.

We claim:

1. A combustor assembly for gas turbine engines comprising:
a plurality of generally annular members having a common center line, each such member having at one end a first cylindrical portion having a cylindrical inner surface concentric about said center line, a second axially inwardly tapered portion at the other end, and a third step-shaped portion intermediate said first and second portions, each said step-shaped portion having a cylindrical first surface concentric about said center line and a second surface normal to said center line defining said step, said annular members being disposed in nested substantially coaxial relationship spaced axially along said center line with at lest a portion of said first cylindrical portions nested in said third step portions, said inner surfaces of said first portions facing said first surfaces, said first and second portions being disposed in overlapping relationship, said first cylindrical portions having holes therein which in combination with said overlapping first and second portions define airflow passages, said first and third portions defining a substantially smooth outer wall, each said first surface having a machined diameter just slightly less than the inside diameter of each said first cylindrical portion, one of said facing first portion inner surfaces and said first surfaces being upset to define at a plurality of different locations portions of said upset surface in contact with said inner surface; and
brazing material disposed between and bonding said first portion inner surfaces and said first surfaces.

2. An assembly for a combustor as described in claim 1 in which the upset portions define interconnected spaces for holding said brazing material.

3. An assembly for a combustor as described in claim 2 in which the radial dimension of said spaces are substantially the same whereby prior to brazing said annular members are each substantially fixedly held concentric about said center line.

4. An assembly for a combustor as described in claim 3 in which said upset portions and spaces define a knurled surface.

* * * * *